(12) United States Patent
Takada et al.

(10) Patent No.: US 9,257,928 B2
(45) Date of Patent: Feb. 9, 2016

(54) CONTROL DEVICE FOR STEPPING MOTOR AND CONTROL METHOD FOR STEPPING MOTOR

(71) Applicant: MINEBEA CO., LTD., Kitasaku-Gun, Nagano (JP)

(72) Inventors: Kazuo Takada, Kosai (JP); Takayuki Matsui, Toyohashi (JP); Haruka Miyaji, Toyohashi (JP)

(73) Assignee: Minebea Co., Ltd., Nagano (JP)

( * ) Notice: Subject to any disclaimer, the term of this patent is extended or adjusted under 35 U.S.C. 154(b) by 51 days.

(21) Appl. No.: 14/301,579

(22) Filed: Jun. 11, 2014

(65) Prior Publication Data

US 2015/0042258 A1 Feb. 12, 2015

(30) Foreign Application Priority Data

Aug. 9, 2013 (JP) .................. 2013-166766

(51) Int. Cl.
| | |
|---|---|
| *H02P 8/00* | (2006.01) |
| *H02P 8/24* | (2006.01) |
| *H02P 8/10* | (2006.01) |
| *H02P 8/38* | (2006.01) |
| *H02P 8/28* | (2006.01) |

(52) U.S. Cl.
CPC .. *H02P 8/24* (2013.01); *H02P 8/10* (2013.01); *H02P 8/28* (2013.01); *H02P 8/38* (2013.01)

(58) Field of Classification Search
CPC .... G05B 2219/41326; H02P 8/24; H02P 8/38
See application file for complete search history.

(56) References Cited

U.S. PATENT DOCUMENTS

2008/0217846 A1\* 9/2008 Shibagaki ............ B41J 13/0018
271/264

FOREIGN PATENT DOCUMENTS

JP 2012-016122 A 1/2012

\* cited by examiner

*Primary Examiner* — Karen Masih
(74) *Attorney, Agent, or Firm* — Carrier Blackman & Associates, P.C.; Joseph P. Carrier; William D. Blackman (57) ABSTRACT

There is provided a control device for a stepping motor, configured to apply an excitation current to multiple coils to rotate a rotor. The control device includes a drive unit configured to apply a drive voltage to the coils, and a control unit configured to control the drive voltage applied by the drive unit, wherein the control unit includes a stop control unit configured to perform, during a hold period of a stop period of the stepping motor, a stop control which gradually decreases a magnitude of the excitation current flowing in the coils such that the rotor moves to a predetermined stop position, and wherein the stop control unit is configured to perform the stop control such that a variation amount of the excitation current per unit time becomes a predetermined threshold value for the stop period or less.

15 Claims, 9 Drawing Sheets

CONTROL DEVICE FOR STEPPING MOTOR AND CONTROL METHOD FOR STEPPING MOTOR

BACKGROUND OF THE INVENTION

1. Field of the Invention

The present invention relates to a control device for a stepping motor and a control method for a stepping motor, and particularly, to a control device for a stepping motor and a control method for a stepping motor, which move a rotor to a predetermined position during activation period or stop period of the stepping motor.

2. Description of the Related Art

A stepping motor is excited by applying an excitation current to multiple coils, whereby a rotor is driven to rotate in steps. During activation period of the stepping motor, in general, a hold current for attracting the rotor positioned at an arbitrary position to a position (an initial position) facing a stator is applied to the coils, and after vibration of the rotor at the initial position stops, a driving current is applied, whereby normal driving is performed. Since the stepping motor is driven as described above, it is possible to prevent hunting of the stepping motor and to surely activate the stepping motor.

For example, JP-A-2012-016122 discloses a motor control method during activation period, where a hold current is slowly increased during start period.

According to this control method, since a rotor of a stepping motor slowly moves to an initial position during activation period, it is possible to suppress generation of vibration sound and impact sound.

Incidentally, although a method of controlling a stepping motor as disclosed in JP-A-2012-016122 is used, it is desired to further suppress generation of vibration sound, impact sound, and the like during driving period of the stepping motor.

SUMMARY OF THE INVENTION

The present invention has been made in view of the above circumstances, and an object of the present invention is to provide a control device for a stepping motor and a control method for a stepping motor which are capable of suppressing a level of sound generated during driving period of the stepping motor.

According to an illustrative embodiment of the present invention, there is provided a control device for a stepping motor, the control device configured to apply an excitation current to multiple coils to rotate a rotor. The control device comprises: a drive unit configured to apply a drive voltage to the coils; and a control unit configured to control the drive voltage applied by the drive unit, wherein the control unit includes a stop control unit configured to perform, during a hold period of a stop period of the stepping motor, a stop control which gradually decreases a magnitude of the excitation current flowing in the coils such that the rotor moves to a predetermined stop position, and wherein the stop control unit is configured to perform the stop control such that a variation amount of the excitation current per unit time becomes a predetermined threshold value for the stop period or less.

In the above control device, the predetermined threshold value for the stop period may be set such that a level of sound generated when the rotor moves to the stop position becomes a predetermined level or less.

In the above control device, the stop control unit may be configured to perform, during the hold period of the stop period, the stop control where a drive voltage subjected to pulse width modulation such that a duty ratio thereof decreases as time proceeds or a drive voltage whose voltage value decreases as time proceeds is applied to the coils by the drive unit, such that the excitation current gradually decreases as time proceeds.

In the above control device, the control unit may further include: a detecting unit configured to detect the excitation current; and a signal generating unit configured to generate a control signal such that, during the hold period of the stop period, the excitation current detected by the detecting unit becomes close to a predetermined target current which gradually decreases as time proceeds, and the drive unit may be configured to generate a drive voltage subjected to pulse width modulation with a duty ratio according to the control signal generated by the signal generating unit.

In the above control device, when the excitation current detected by the detecting unit is less than the target current, the signal generating unit may be configured to set the control signal at a first value such that the duty ratio of the drive voltage becomes larger than that before the setting, and when the excitation current detected by the detecting unit reaches the target current, the signal generating unit may be configured to set the control signal at a second value such that application of the drive voltage to the multiple coils is stopped.

In the above control device, the stop control unit may be configured to perform the stop control such that the excitation current linearly decreases during the hold period of the stop period.

In the above control device, the stop control unit may be configured to perform the stop control such that a value of the excitation current at a start of the hold period of the stop period becomes larger than 30% of a value of the excitation current flowing in the coils before the hold period of the stop period starts.

In the above control device, the control unit may further include an out-of-step detecting unit configured to detect out-of-step of the stepping motor, and when the stepping motor is stopped based on a detection result of the out-of-step detecting unit, the stop control unit may be configured to perform the stop control such that an excitation pattern of the excitation current during the hold period becomes an excitation pattern same as that when out-of-step of the stepping motor is detected by the out-of-step detecting unit.

In the above control device, the control unit may further include an activation control unit configured to perform, during a hold period of an activation period of the stepping motor, an activation control which gradually increases the magnitude of the excitation current flowing in the coils such that the rotor moves to a predetermined initial position, and the activation control unit may be configured to perform the activation control such that the variation amount of the excitation current per unit time becomes a predetermined threshold value for the activation period or less.

In the above control device, the activation control unit may be configured to perform the activation control such that a value of the excitation current at an end of the hold period of the activation period becomes larger than 30% of the value of the excitation current flowing in the coils after the end of the hold period of the activation period.

According to another illustrative embodiment of the present invention, there is provided a control device for a stepping motor, the control device configured to apply an excitation current to multiple coils to rotate a rotor. The control device comprises a drive unit configured to apply a drive voltage to the coils; and a control unit configured to control the drive voltage applied by the drive unit, wherein the control unit includes an activation control unit configured to perform, during a hold period of an activation period of the stepping motor, an activation control which gradually increases a magnitude of the excitation current flowing in the coils such that the rotor moves to a predetermined initial position, and wherein the stop control unit is configured to perform the activation control such that a variation amount of the excitation current per unit time becomes a predetermined threshold value for the activation period or less, and that a value of the excitation current at an end of the hold period of the activation period becomes larger than 30% of the value of the excitation current applied after the end of the hold period of the activation period.

In the above control device, the control unit may further include an out-of-step detecting unit configured to detect out-of-step of the stepping motor, and the activation control unit may be configured to perform the activation control only when the stepping motor is stopped based on a detection result of the out-of-step detecting unit and the stepping motor is driven next time.

According to a further illustrative embodiment of the present invention, there is provided a control method for a stepping motor, which applies an excitation current to multiple coils to rotate a rotor. The control method comprises controlling a drive voltage applied to the coils during a normal driving period of the stepping motor, and performing, during a hold period of a stop period of the stepping motor, a stop control which gradually decreases a magnitude of an excitation current flowing in the coils such that the rotor moves to a predetermined stop position, wherein the stop control is performed such that a variation amount of the excitation current per unit time becomes a predetermined threshold value for the stop period or less.

According to a still further illustrative embodiment of the present invention, there is provided a control method for a stepping motor, which applies an excitation current to multiple coils to rotate a rotor. The control method comprises controlling a drive voltage applied to the coils during a normal driving of the stepping motor; and performing, during a hold period of an activation period of the stepping motor, an activation control which gradually increases a magnitude of the excitation current flowing in the coils such that the rotor moves to a predetermined initial position, wherein the activation control is performed such that a variation amount of the excitation current per unit time becomes a predetermined threshold value for the activation period or less, and that a value of the excitation current at an end of the hold period of the activation period becomes larger than 30% of the value of the excitation current applied after the end of the hold period of the activation period.

According to the above configuration, it is possible to provide a control device for a stepping motor and a control method for a stepping motor which are capable of suppressing a level of sound generated during driving period of the stepping motor.

DETAILED DESCRIPTION

Hereinafter, a control device for a stepping motor according to illustrative embodiments of the present invention will be described.

First Illustrative Embodiment

Figure 1:
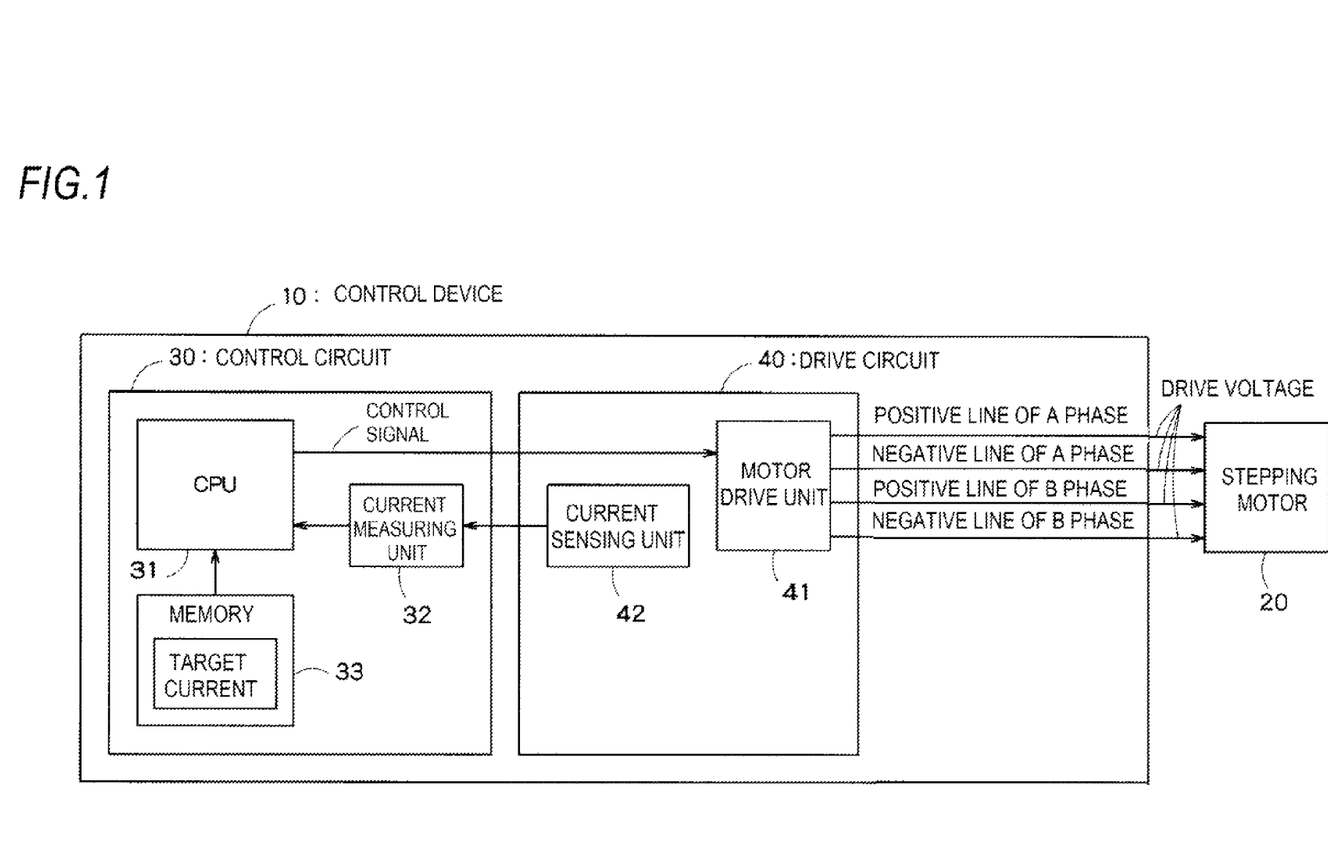
FIG. 1 is a block diagram showing a control device for a stepping motor according to a first illustrative embodiment of the present invention.

FIG. 1 is a block diagram showing a control device for a stepping motor according to a first illustrative embodiment of the present invention.

As shown in FIG. 1, a control device 10 supplies a drive voltage to a stepping motor 20, thereby driving the stepping motor 20.

The stepping motor 20 includes a rotor, a stator, and multiple coils (not shown) wound on the stator. For example, the stepping motor 20 has coils of two phases, i.e. an A-phase coil and a B-phase coil. The drive voltage is supplied from the control device 10 to the stepping motor 20 through positive and negative lines of the A phase and the B phase. In the present illustrative embodiment, the stepping motor 20 is used, for example, as an actuator of an on-vehicle air conditioner. However, the present invention is not limited thereto.

The control device 10 mainly includes a control circuit (an example of a control unit) 30 and a drive circuit (an example of a drive unit) 40. The drive circuit 40 applies the drive voltage to the coils of the stepping motor 20. The control circuit 30 controls the drive circuit 40, thereby controlling the drive voltage applied by the drive circuit 40. That is, the control device 10 applies the drive voltage to the multiple coils of the stepping motor 20, such that an excitation current flows in the coils, whereby the rotor of the stepping motor 20 is rotated.

The control circuit 30 includes a central processing unit (CPU) (an example of an activation control unit, a stop control unit, or a signal generating unit) 31, a current measuring unit 32, and a memory 33. The drive circuit 40 includes a motor drive unit 41 and a current sensing unit 42.

The current sensing unit 42 and the current measuring unit 32 detect a value of the excitation current flowing in each coil of the stepping motor 20. Specifically, for example, the current sensing unit 42 applies the excitation current to a shunt resistor and detects a voltage drop at the shunt resistor. Then, the current measuring unit 32 calculates the excitation current value of each coil based on a voltage drop detected by the current sensing unit 42.

The CPU 31 generates a control signal for controlling the drive voltage, and outputs the control signal to the motor drive unit 41. During normal activation period of the stepping motor 20, the CPU 31 generates and outputs the control signal, for example, such that the excitation current has a predetermined sine wave form.

In the present illustrative embodiment, the CPU 31 performs an activation control (described below) during a hold period of a predetermined activation period from an activation start of the stepping motor 20. Also, the CPU 31 performs a stop control (described below) during a hold period of a predetermined stopping period from a stop start of the stepping motor 20 when normal driving of the stepping motor 20 finishes. In each of the activation control and the stop control, the control signal is generated based on the corresponding control and output. In the present illustrative embodiment, this control signal is a PWM signal obtained by pulse width modulation.

According to the control signal supplied from the CPU 31, the motor drive unit 41 applies the drive voltage, which is a signal subjected to pulse width modulation (hereinafter, referred to as the pulse width modulation (PWM) signal), to the coils of the stepping motor 20.

If the drive voltage is applied to the coils of the stepping motor 20 as described above, the excitation current flows, whereby the stator is excited. The direction of the excitation current flowing in the coils of two phases is alternately switched, whereby magnetic poles excited at the stator change, and the rotor rotates.

Figure 2:
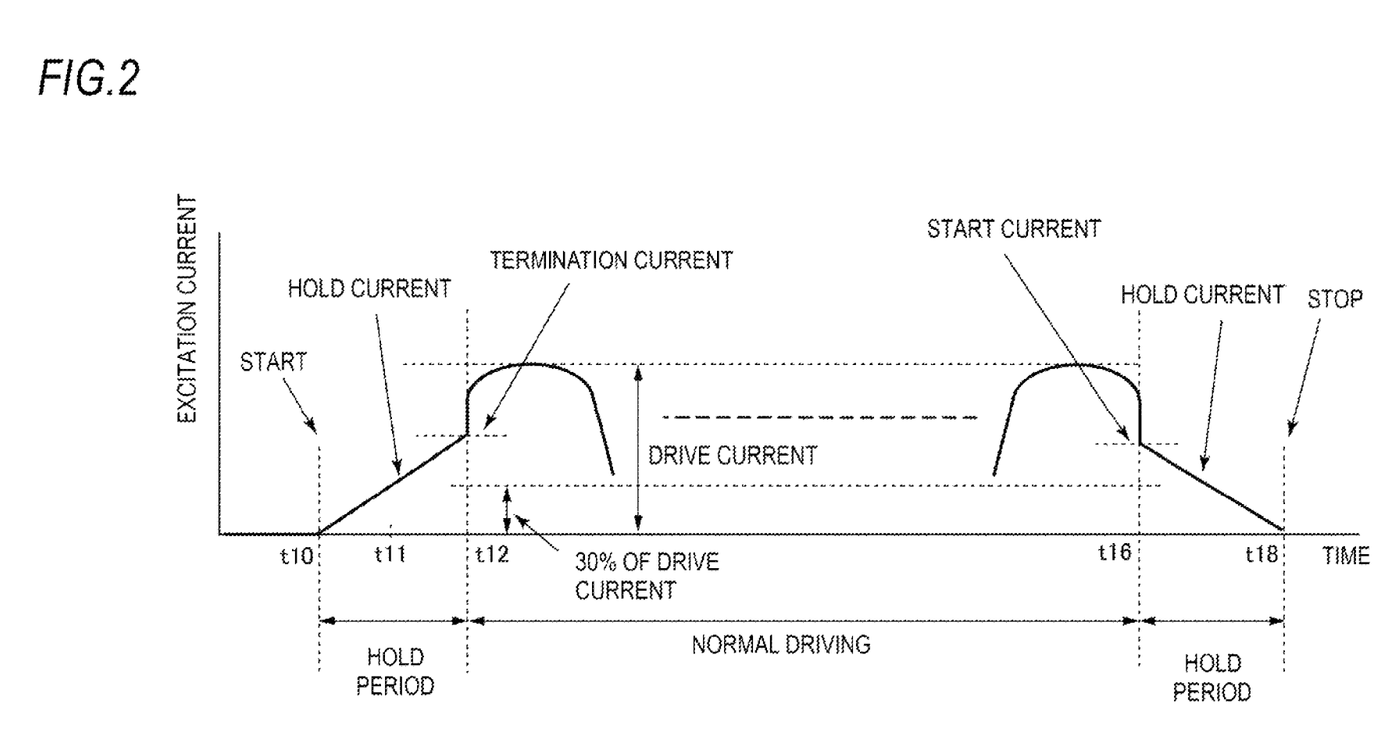
FIG. 2 is a view showing an example of a waveform of an excitation current.

FIG. 2 is a view showing an example of a waveform of the excitation current.

In the graph of FIG. 2, the horizontal axis represents time t, and the vertical axis represents the value of the excitation current. Also, both of the A-phase coil and the B-phase coil of the stepping motor 20 are controlled such that a similar excitation current flows.

As shown in FIG. 2, during a period from when the stepping motor 20 is activated to when the stepping motor 20 is stopped, various driving controls are performed by the control device 10 during an activation period (from a time t10 to a time t12), a normal driving period (the time t12 to a time t16), and a stop period (the time t16 to a time t18).

During the normal driving period, the drive voltage is applied from the control device 10 such that a normal excitation current (which may be referred to as a drive current) flows in the coils. In FIG. 2, the waveform of the drive current is simplified. The actual waveform of the drive current becomes, for example, a sine wave form having a predetermined period.

In the present illustrative embodiment, the CPU 31 performs the activation control during the activation period and performs the stop control during the stop period.

[Description of Activation Control]

Transition of the excitation current when the activation control is performed will be described below, for example, with reference to FIG. 2. When activation of the stepping motor 20 starts at the time t10, the CPU 31 performs control such that the control device 10 starts to apply a drive voltage to the stepping motor 20. Then, during the hold period from the time t10 to the time t12, the control device 10 performs control such that the excitation current slowly increases as time proceeds. This control is performed such that the excitation current increases linearly. The excitation current which flows in the coils during the hold period such that the rotor moves to an initial position may be referred to as a hold current. In the present illustrative embodiment, the length of the hold period from the time t10 to the time t12 is determined in advance, and is, for example, 100 milliseconds (ms). The length of the hold period may be appropriately set in view of a time required until the rotor moves to the initial position and vibration stops.

This activation control is performed based on control of the CPU 31, for example, as follows. That is, the CPU 31 compares the excitation current value calculated by the current measuring unit 32, with a target current value stored in the memory 33. The CPU 31 adjusts a duty ratio for driving the stepping motor 20 such that the calculated excitation current value becomes close to the target current value. The CPU 31 generates a control signal corresponding to the adjusted duty ratio, and supplies the control signal to the motor drive unit 41. As a result, in the motor drive unit 41, a drive voltage subjected to pulse width modulation with the duty ratio according to the control signal is generated.

In the present illustrative embodiment, the target current value is set such that the current excitation linearly increases as time proceeds, and the excitation current value reaches a predetermined value (a termination current value) at an end of the hold period. In other words, the control is performed such that timing when a hold current value reaches the termination current value and the end of the hold period become the same timing. The target current value is stored, for example, in the memory 33.

The termination current value is set in a range from 30% to 100% of the maximum value of the drive current (the maximum value of the excitation current applied to the coils after the end of the hold period of the activation period). For example, it is assumed that the termination current value at the start (the activation start) is set to the value of 70% of the maximum value of the drive current. In this case, during the hold period, control is performed such that the value of the hold current gradually increases from the value of 0% of the maximum value of the drive current to the value of 70% of the maximum value of the drive current, that is, the termination current value. When the value of the hold current reaches the termination current value, whereby the hold period of the activation period ends, the CPU 31 suddenly increases the excitation current value from the termination current value, and starts stable normal driving in a range where the excitation current value is the maximum value (the value of 100%) of the drive current.

If the termination current value is set to less than 30% of the maximum value of the drive current, since an exciting force becomes relatively week, even when the activation control is performed, the rotor may not move to the initial position, and thus it may be impossible to appropriately drive the stepping motor 20. For this reason, it is preferable to set the termination current value such that the lower limit of the termination current value becomes 30% of the maximum value of the drive current such that the drive current value becomes 30% or more of the maximum value of the drive current).

Since the above-described control is performed during the hold period of the activation period such that a inaptitude of the excitation current (the hold current) gradually increases, even if the rotor is at any position before activation, the rotor is slowly attracted to the position (initial position) facing the stator, and stops at that position. Since the hold current increases to the termination current value, it is possible to surely attract the rotor to the initial position. After the end of the hold period, a normal driving operation is performed, whereby the stepping motor 20 surely operates. During the hold period, since the rotor moves from the position before activation to the initial position, not at a high speed, it is possible to suppress generation of noise such as vibration sound and impact sound from the stepping motor 20.

Figure 3:
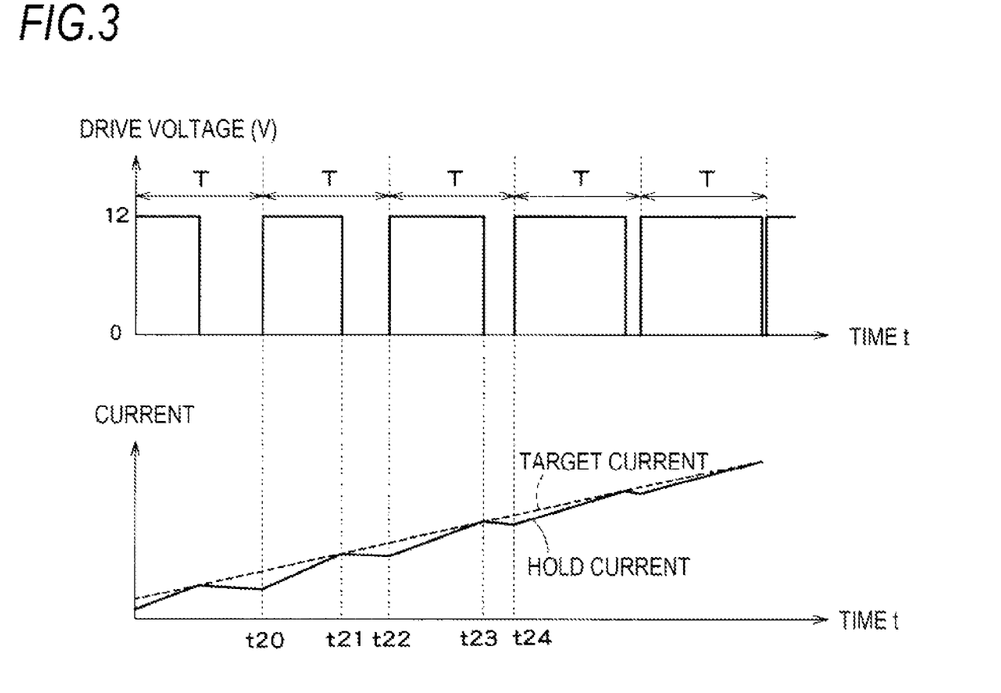
FIG. 3 is a view showing an example of control on a hold current during activation period.
Figure 4:
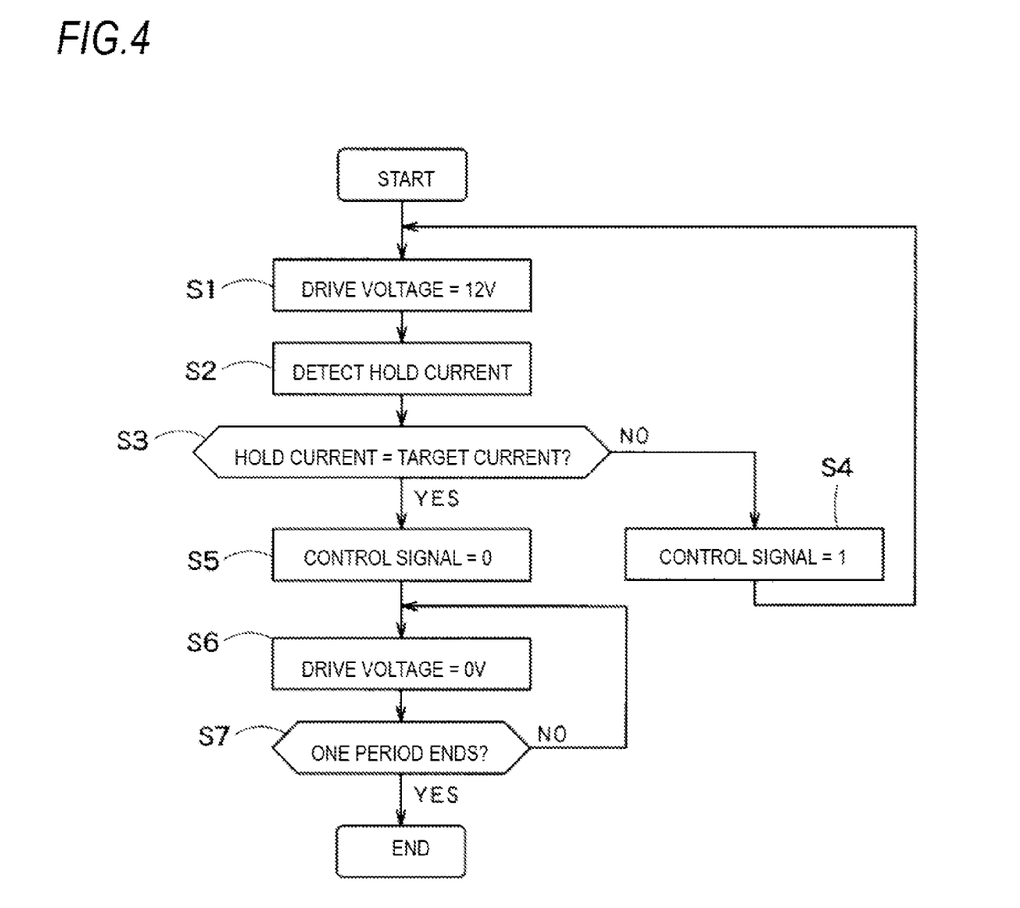
FIG. 4 is a flow chart showing an example of control of the control device during activation period.

FIG. 3 is a view showing an example of control on the hold current during the activation period. FIG. 4 is a flow chart showing an example of the control of the control device 10 during activation period.

In FIG. 3, a waveform of the drive voltage applied around a time t11 of FIG. 2 by the motor drive unit 41, and waveforms of a target current and the hold current are shown on an enlarged scale. In FIG. 3, a period from a rising time of the drive voltage to the next rising time of the drive voltage, such as a period from a time t20 to a time t22 or a period from the time t22 to a time t24 corresponds to a period T of the PWM signal. In FIG. 4, a processing operation which the control device 10 performs for one period of the PWM signal is shown.

In the present illustrative embodiment, since the drive voltage subjected to pulse width modulation such that a duty ratio thereof increases as time proceeds is applied to the coils during the hold period of the activation period, the CPU 31 performs the activation control such that the hold current gradually increases as time proceeds. This will be described with reference to FIGS. 3 and 4.

First, in Step S1, the CPU 31 switches the control signal from a low level to a high level (a first value) at the time t20 which is the start of the period T. In response to this transition, the motor drive unit 41 switches the drive voltage from a low level to a high level. For example, the low level and high level of the drive voltage correspond to 0 V and 12 V, respectively. Next, in Step S2, the current sensing unit 42 and the current measuring unit 32 detect the value of the hold current flowing in the coils. During a period from the time t20 to immediately before a time t21, since the hold current is lower than the target current ("NO" in Step S3), in Step S4, the CPU 31 maintains the control signal at the high level (the first value). In this case, the drive voltage is maintained at the high level (Step S1), and the duty ratio of the PWM signal (the ratio of an ON period of the PWM signal with respect to each period) increases. When the drive voltage is at the high level, the excitation current flowing in the coils is increased.

When the hold current reaches the target current at the time t21 ("YES" in Step S3), in Step S5, the CPU 31 switches the control signal to the low level (a second value). In response to this transition, the motor drive unit 41 switches the drive voltage to the low level in Step S6, thereby stopping applying the drive voltage to the coils. Thereafter, the drive voltage is maintained at the low level until the time t22 which is the end of the period T (Steps S6 and S7). The ratio of the period from the time t20 to the time t21 when the drive voltage is at the high level to the period T is the duty ratio of the PWM signal.

During the period from the time t21 to the time t22 when the drive voltage is at the low level, although a voltage is not applied between both ends of each coil, the inductance component of the coil causes the hold current to gradually decrease as shown in FIG. 3. As a result, the hold current becomes lower than the target current.

Thereafter, at the time t22 which is the start of the next period, the control device 10 starts the processing operation of FIG. 4, and the motor drive unit 41 switches the drive voltage to the high level again. As a result, the hold current starts to increase. During the period from the time t22 to the time t24, the target current is higher than that in the period from the time t20 to the time t22. For this reason, during a period from the time t22 to a time t23 longer than the period from the time t20 to the time t21, the drive voltage is set at the high level.

As described above, during the hold period from the time t10 to the time t12 of FIG. 2, the processing operation of FIG. 4 is repeatedly performed. That is, when the value of the hold current does not reach the value of the target current, the CPU 31 sets the control signal at the high level such that the duty ratio of the drive voltage becomes larger than that before this setting, and when the value of the hold current reaches the value of the target current, the CPU 31 switches the control signal to the low level such that application of the drive current to the multiple coils is stopped. As a result, the duty ratio of the PWM signal gradually increases, and thus the hold current is generated such that the hold current linearly increases according to the target current as shown in FIG. 2.

Incidentally, as shown in FIG. 3, strictly, the hold current increases with sawtooth ripples. However, the period T of the PWM signal is sufficiently shorter than the hold period (from the time t10 to the time t12). For example, the hold period is 100 ms, whereas the period T of the PWM signal is about 0.1 ms. For this reason, it can be said that the hold current increases gradually and linearly.

[Description of Stop Control]

Transition of the excitation current when the stop control is performed will be described below, for example, with reference to FIG. 2. When stop of the stepping motor 20 starts at the time t16, the CPU 31 performs the stop control during the hold period of the stop period from the time t16 to the time t18. When the stop control starts, the control device 10 performs control such that the excitation current value (the hold current value) decreases gradually from a predetermined value (a start current) as time proceeds. This control is performed such that the excitation current decreases linearly. Since the stop control is performed as described above, the rotor moves to a predetermined stop position, and stops. In other words, the stop control is control which is performed for gradually decreasing the magnitude of the hold current during the hold period of the stop period such that the rotor moves to the predetermined stop position. In the present illustrative embodiment, the length of the hold period from the time t16 to the time t18 during the stopping period is determined in advance, and is, for example, 100 milliseconds (ins). The length of the hold period may be appropriately set in view of a time required until the rotor moves to the stop position and vibration stops. The hold period of the stop period may be set to have substantially the same length as that of the hold period of the activation period, or may be set to have a length different from that of the hold period of the activation period.

Similarly to the activation control, this stop control is performed based on control of the CPU 31, for example, as follows. That is, the CPU 31 compares the excitation current value calculated by the current measuring unit 32, with the target current value stored in the memory 33. The CPU 31 adjusts a duty ratio for driving the stepping motor 20 such that the calculated excitation current value becomes close to the target current value. The CPU 31 generates the control signal corresponding to the adjusted duty ratio and supplies the control signal to the motor drive unit 41. As a result, in the motor drive unit 41, the drive voltage subjected to pulse width modulation with a duty ratio according to the control signal is generated. Incidentally, specific control performed in this case is similar to the control method performed in the above-described activation control, and thus will not be described in detail. That is, although the stop control is different from the control described with reference to FIGS. 3 and 4 in whether the target current value increases or decreases, even in the stop control, the similar control to the control described with reference to FIGS. 3 and 4 is performed. Since the drive voltage subjected to pulse width modulation such that the duty ratio thereof decreases as time proceeds is applied to the coils during the hold period of the stop period, the CPU 31 performs the stop control such that the hold current gradually decreases as time proceeds.

In the present illustrative embodiment, the target current value is set such that the hold current value has a start current value at the start of the hold period of the stop period, linearly decreases as time proceeds, and becomes substantially 0 at the end of the hold period. In other words, control is performed such that the timing when the hold current value substantially reaches 0 and the end of the hold period become the same timing. The target current value for the stop control is also stored, for example, in the memory 33.

The start current value is set in a range from 30% to 100% of the maximum value of the drive current (the maximum value of the excitation current applied to the coils before the hold period of the stopping period starts). For example, it is assumed that the start current value at the start timing (the stopping start timing) is set to the value of 70% of the maximum value of the drive current. In this case, at the time t16 which is the start of the hold period of the stopping period, control is performed such that the value of the excitation current suddenly decreases from the value of the drive current (the value of 100% of the maximum value of the drive current) applied until that timing, to the start current value. Thereafter, during the hold period from the time t16 to the time t18, control is performed such that the value of the hold current decreases gradually from the value of 70% of the maximum value of the drive current to the value of 0% of the maximum value of the drive current. When the value of the hold current reaches the value of 0% of the maximum value of the drive current, whereby the hold period of the stopping period ends, stop of the stepping motor 20 is completed.

If the start current value is set to less than 30% of the maximum value of the drive current, since the exciting force becomes relatively week, even when the stop control is performed, it may be impossible to attract the rotor to the stop position, causing the rotor to be free. Therefore, a degree of suppressing the level of noise generated by the stepping motor 20 during stop may decrease. For this reason, it is preferable to set the start current value such that the lower limit thereof becomes 30% of the maximum value of the drive current (such that the start current value becomes 30% or more of the maximum value of the drive current).

Figure 5:
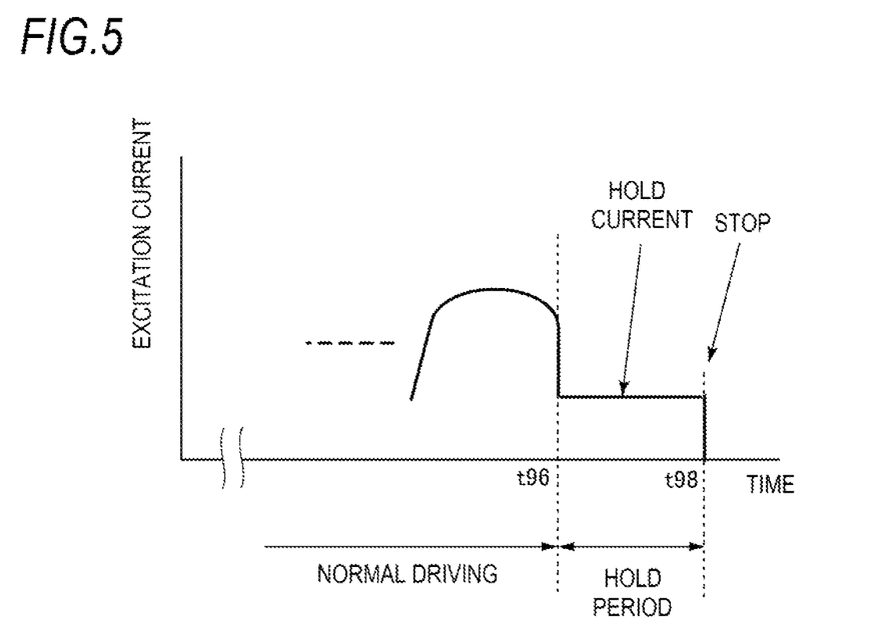
FIG. 5 is a view showing an example of related-art control during stop period.

FIG. 5 is a view showing an example of related-art stop control during stop period.

As shown in FIG. 5, according to the related-art control, during stopping of the stepping motor 20, during a hold period (from a tune t96 to a time t98), control is performed such that a hold current having a constant magnitude is applied to the coils. When this stop control is performed, the rotor moves to the position (the stop position) facing the stator at a high speed, and thus vibration sound and impact sound would be generated by the stepping motor 20.

In contrast to this, in the present illustrative embodiment, as shown in FIG. 2, during the hold period of the stopping period, control is performed such that the magnitude of the hold current gradually decreases. Therefore, even if the rotor is at any position before stop, the rotor is slowly attracted to the stop position, and stops at the stop position. Since the hold current decreases from the start current value, it is possible to surely attract the rotor to the stop position. During the hold period, since the rotor moves from the position before stop to the stop position, not at a high speed, it is possible to suppress generation of noise such as vibration sound and impact sound from the stepping motor 20.

[Description of Variation Pattern of Hold Current in Activation Control or Stop Control]

In the above description, each of the activation control and the stop control is performed by the CPU 31 such that the hold current linearly varies during the hold period. However, the variation pattern of the hold current is not limited to the linear variation pattern. For example, the variation pattern may be set to vary in an upwardly convex curve shape or in a downwardly convex curve shape in the relation between the time elapse and the magnitude of the excitation current as shown in FIG. 2. This variation pattern can be set by appropriately setting the target current value.

Figure 6:
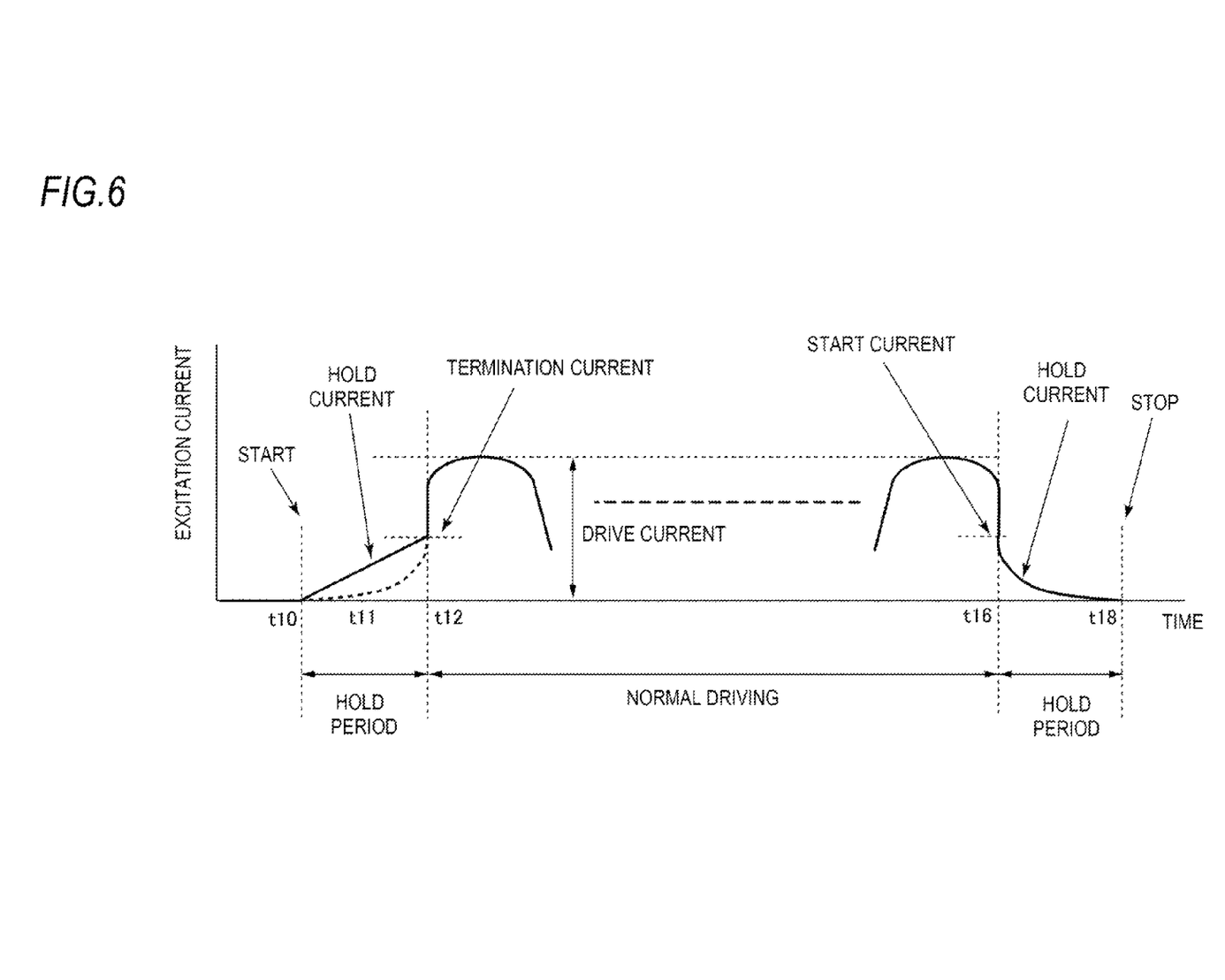
FIG. 6 is a view showing a variation pattern of a hold current according to a modification of the first illustrative embodiment.

FIG. 6 is a view showing a variation pattern of a hold current according to a modification of the present illustrative embodiment.

Similarly to FIG. 2, FIG. 6 shows a variation in the magnitude of the excitation current. As shown in FIG. 6, during the hold period (from the time t16 to the time t18) of the stop period, the hold current varies in a falling pattern having a downwardly convex curve shape. Even in this case, at the time t16, the hold current value becomes the start current value. Also, at the time t18, the hold current value becomes 0 (the value of 0% of the maximum value of the drive current). During the hold period of the stop period, the stop control is performed such that a variation amount of the hold current per unit time (a variation rate) is relatively large at first, and the variation rate gradually decreases as time proceeds.

Also, as shown by a broken line in FIG. 6, the activation control may be performed such that the hold current varies in a rising pattern having a downwardly convex curve shape. That is, during the hold period of the activation period from the time t10 to the time t12, the activation control may be performed such that the variation rate of the hold current is relatively small at first, and the variation rate gradually increases as time proceeds such that the hold current reaches the termination current value at the time t12.

Figure 7:
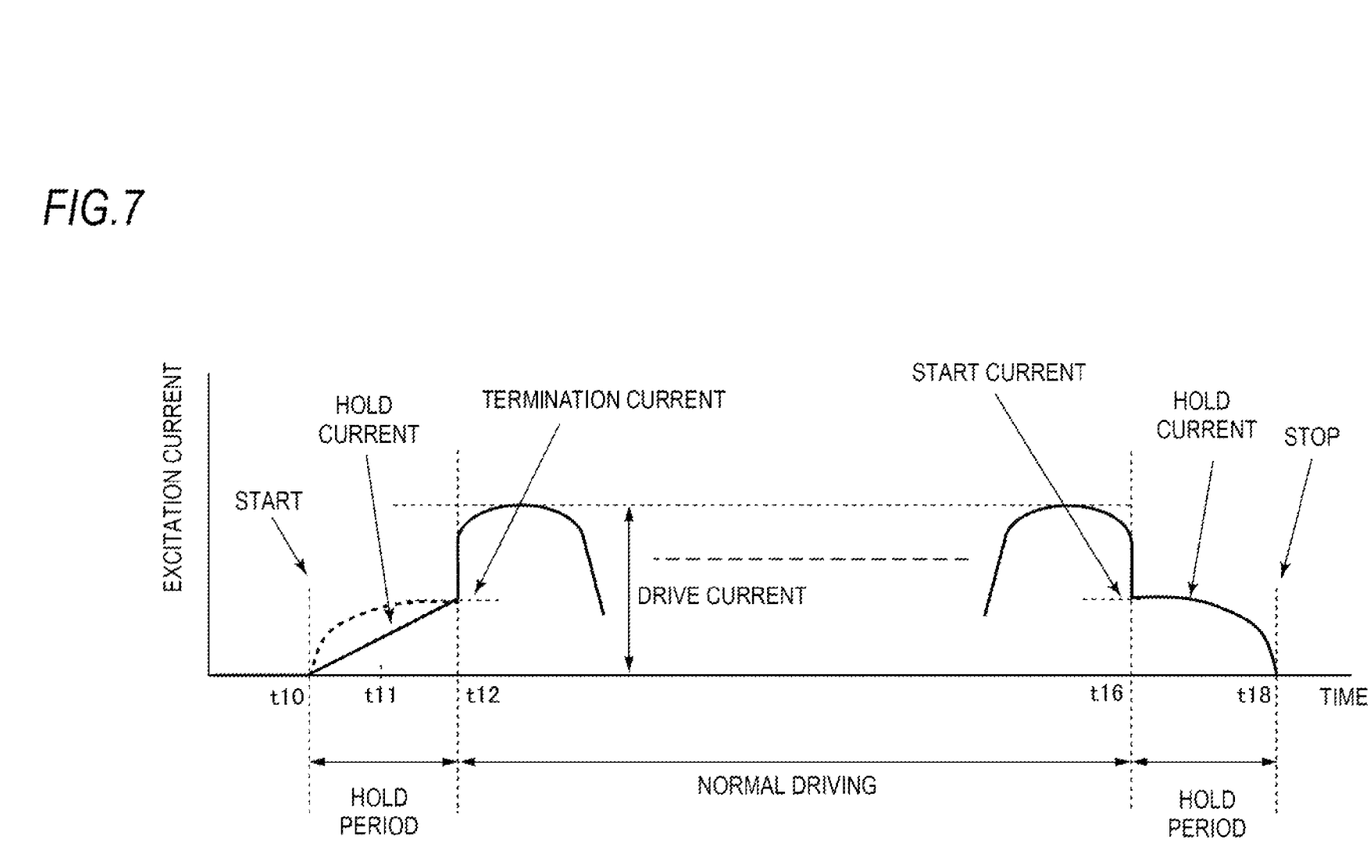
FIG. 7 is a view showing a variation pattern of a hold current according to another modification of the first illustrative embodiment.

FIG. 7 is a view showing a variation pattern of a hold current according to another modification of the present illustrative embodiment.

Similarly to FIG. 2, FIG. 7 shows a variation in the magnitude of the excitation current. As shown in FIG. 7, during the hold period of the stop period, the hold current varies in a falling pattern having an upwardly convex curve shape. Even in this case, at the time t16, the hold current value becomes the start current value. Also, at the time t18, the hold current value becomes 0. During the hold period of the stop period, the stop control is performed such that the variation rate of the hold current is relatively small at first, and the variation rate gradually increases as time proceeds.

Also, as shown by a broken line in FIG. 7, the activation control may be performed such that the hold current varies in a rising pattern having an upwardly convex curve shape. That is, during the hold period of the activation period, the activation control may be performed such that the variation rate of the hold current is relatively large at first, and the variation rate gradually decreases as time proceeds such that the hold current reaches the termination current value at the time t12.

In the present illustrative embodiment, as described above, not only when the hold current linearly increases, but also when the hold current increases in an upwardly or downwardly convex curve shape in a graph, the activation control is performed such that the variation rate of the hold current becomes a predetermined threshold value of the activation period or less. Also, not only when the hold current linearly decreases, but also when the hold current decreases in an upwardly or downwardly convex curve shape in a graph, the stop control is performed such that the variation rate of the hold current becomes a predetermined threshold value of the stop period or less. The threshold value of the activation period and the threshold value of the stop period are set such that a level of sound generated when the rotor moves to the initial position or when the rotor moves to the stop position becomes a predetermined level or less. The threshold value of the activation period and the threshold value of the stop period can be appropriately obtained by experiments.

Also, the rising pattern or the falling pattern can be appropriately selected from the above-described three patterns. For example, during the activation period, control may be performed such that the hold current gradually increases in a rising pattern having a downwardly convex curve shape, and during the stop period, control may be performed such that the hold current gradually decreases in a falling pattern having an upwardly convex curve shape, and vise versa.

The noise suppression effect when the start current value is set to 30% or more of the drive current value, and the noise suppression effect when the start current value is set to 100% of the drive current value are at levels approximately close to each other. Therefore, in order to reduce consumption current when performing the stop control, it is preferable to set the start current value in view of both cases such that the upper limit of the start current value becomes about 90% of the drive current value. Similarly, the noise suppression effect when the termination current value is set to 30% or more of the drive current value, and the noise suppression effect when the termination current value is set to 100% of the drive current value are at levels approximately close to each other. Therefore, in order to reduce consumption current when performing the stop control, it is preferable to set the termination current value in view of both cases such that the upper limit of the termination current value becomes about 90% of the drive current value.

Second Illustrative Embodiment

The basic configuration of a control device according to a second illustrative embodiment is the same as that of the first illustrative embodiment, and thus will not be repeatedly described. The second illustrative embodiment is different from the first illustrative embodiment in that, during the hold period, a drive voltage whose voltage value varies as time proceeds is applied to the coils of the stepping motor 20.

That is, in the second illustrative embodiment, during the hold period of the stop period, the CPU 31 applies a drive voltage whose voltage value decreases as time proceeds, to the coils, thereby performing stop control such that the hold current gradually decreases as time proceeds. Also, during the hold period of the activation period, the CPU 31 applies a drive voltage whose voltage value increases as time proceeds to the coils, thereby performing activation control such that the hold current gradually increases as time proceeds.

Figure 8:
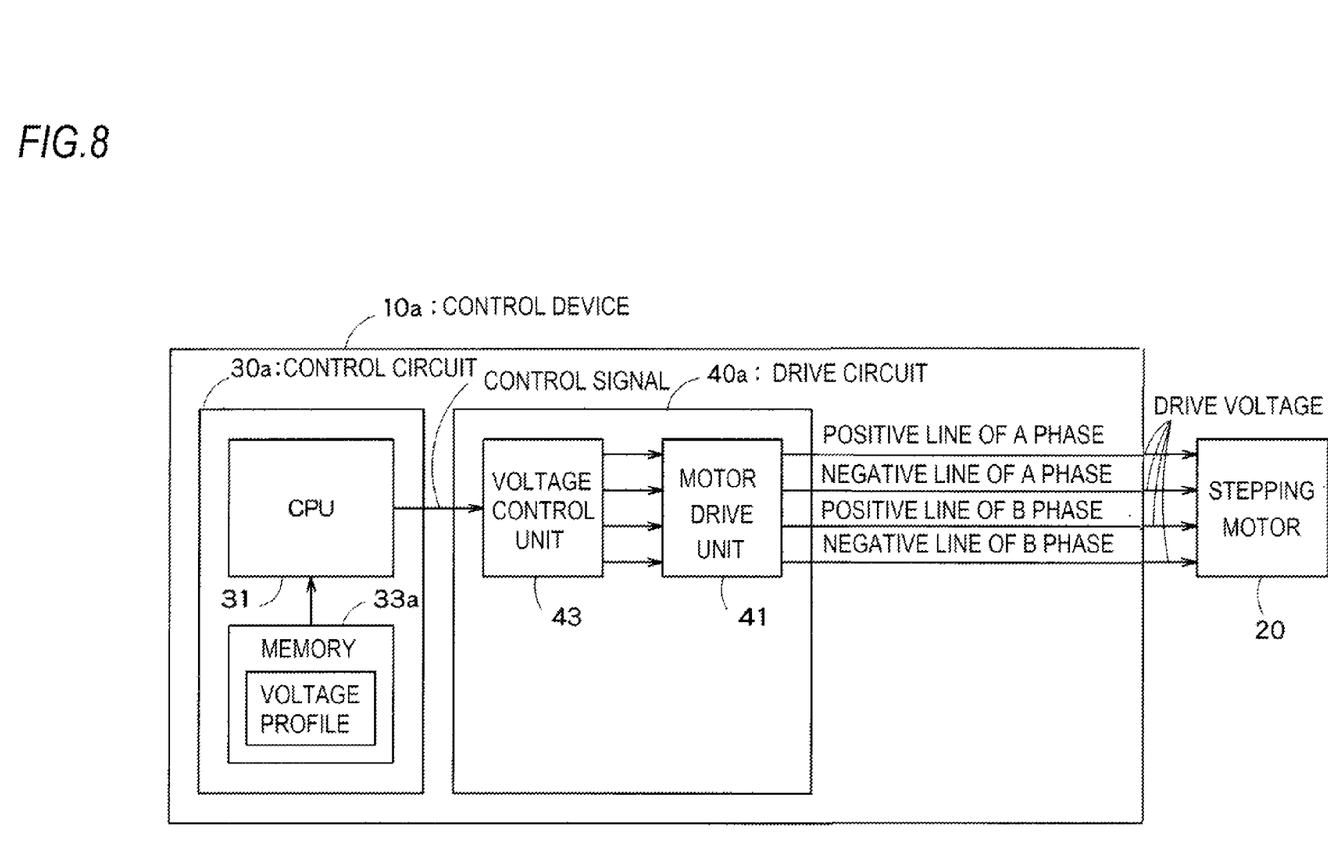
FIG. 8 is a block diagram showing a basic configuration of a control device for a stepping motor according to a second illustrative embodiment.

FIG. 8 is a block diagram showing a basic configuration of a control device 10a for the stepping motor 20 according to the second illustrative embodiment.

As shown in FIG. 8, the control device 10a according to the second illustrative embodiment includes a control circuit 30a and a drive circuit 40a slightly different from those of the above-described control device 10 in their configurations. In FIG. 8, components identical to those of the first illustrative embodiment are denoted by the same reference symbols.

The control circuit 30a includes a CPU 31 and a memory 33a. In the memory 33a, not the target current but a voltage profile is stored in advance. The voltage profile is a table representing the relation between time and the drive voltage value. The CPU 31 generates a control signal which is a digital signal, and supplies the control signal to a voltage control unit 43, such that a drive voltage set according to the voltage profile is applied to the coils of the stepping motor 20.

The drive circuit 40a includes the voltage control unit 43 and a motor drive unit 41. The voltage control unit 43 generates a drive voltage according to the control signal and supplies the drive voltage to the motor drive unit 41. The motor drive unit 41 applies the drive voltage to the coils.

In the first illustrative embodiment, the drive voltage is a PWM signal, and the duty ratio of the PWM signal is gradually changed, whereby the hold current varying linearly is generated. In contrast to this, in the second illustrative embodiment, the voltage value of the drive voltage is gradually changed, whereby the hold current varying linearly is generated. The CPU 31 performs the activation control and the stop control, and thus even in the second illustrative embodiment, the stepping motor 20 is driven by the waveform of an excitation current as shown in FIG. 2.

Figure 9:
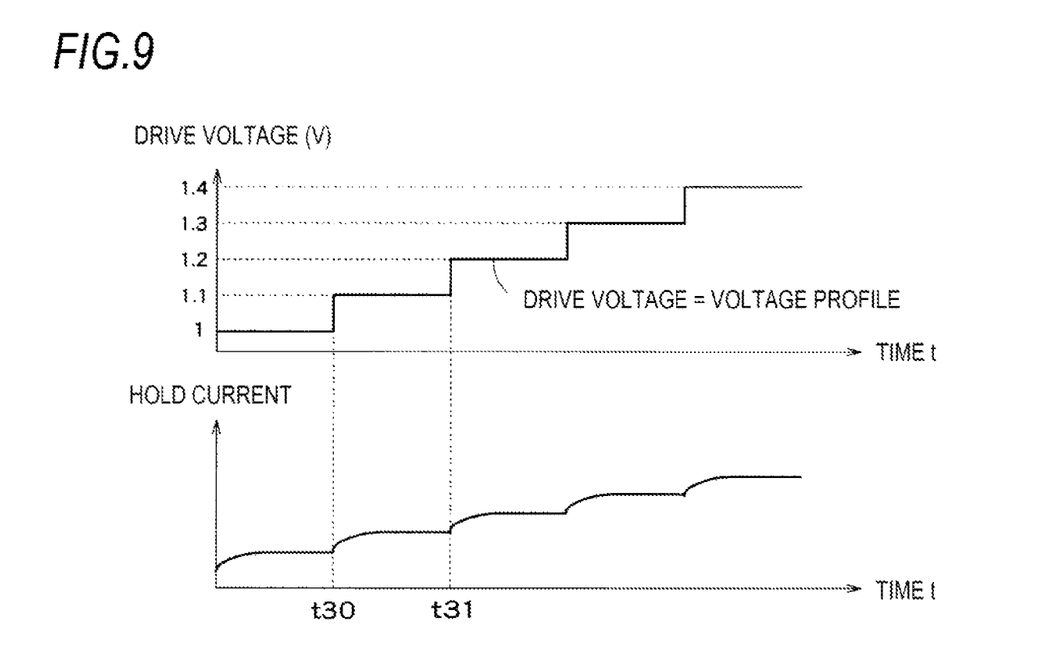
FIG. 9 is a view showing an example of control on a hold current during activation period according to the second illustrative embodiment.

FIG. 9 is a view showing an example of control on the hold current during activation period according to the second illustrative embodiment.

FIG. 9 is an enlarged view of a waveform of the drive voltage applied around the time t11 of FIG. 2 by the motor drive unit 41 and a waveform of the hold current. That is, FIG. 9 corresponds to FIG. 3 of the first illustrative embodiment.

As shown in FIG. 9, the voltage profile is a table set such that the drive voltage increases in a stepwise manner by 0.1 V in FIG. 9) at predetermined time intervals. According to this voltage profile, the drive voltage is applied to the coils.

For example, when the drive voltage switches from 1 V to 1.1 V at a time t30, in response to this transition, the hold current also increases, and converges to a constant value. Thereafter, when the drive voltage switches to 1.2 V at a time t31, the hold current further increases.

As the drive voltage increases, the hold current also increases, and thus the hold current which increases linearly as shown in FIG. 2 can be generated. In the second illustrative embodiment, as shown in FIG. 9, strictly, the hold current increases in a stepwise manner. However, each interval such as an interval between the time t30 and the time t31 where the drive voltage increases in a stepwise manner is sufficiently shorter than the hold period from the time t10 to the time t12. For this reason, it can be said that the hold current increases gradually and linearly.

In the second illustrative embodiment, since a voltage profile which falls in a stepwise manner is set with respect to the stop control, the stop control is also performed according to the voltage profile, as described above. Therefore, during the hold period of the stop period, the stop control is performed such that the hold current gradually decreases as time proceeds.

Also, even in the second illustrative embodiment, the variation pattern of the hold current is not limited to the linear variation pattern. The stop control or the activation control may be performed such that the hold current varies according to a variation pattern varying in a downwardly or upwardly convex curve shape.

As described above, in the second illustrative embodiment, the drive voltage is applied to the coils such that the voltage value of the stepping motor 20 varies in a stepwise manner. Therefore, the hold current varies gradually and linearly, and does not suddenly increase or decrease. Therefore, the rotor moves to the initial position or the stop position, not at a high speed, and during the activation period and the stop period, generation of noise such as vibration sound and impact sound is suppressed.

[Others]

The present invention is not limited to the configurations of the above-described illustrative embodiments. The features of the illustrative embodiments may be appropriately combined such that any other control device for a stepping motor is configured.

The control device may be configured to detect out-of-step of a stepping; motor and detect that the stepping motor has stopped based on the out-of-step detection result. As methods for the out-of-step detection and the like, various methods can be used. In the stepping motor, the rotor is rotated by changing an excitation pattern at each step, and the control device may detect out-of-step of the stepping motor at each step. When the stepping motor is stopped based on the out-of-step detection as described above, the CPU may perform stop control such that the excitation pattern of the excitation current of the hold period of the stop period at that time becomes an excitation pattern same as that when out-of-step of the stepping motor is detected.

The above-described activation control may be performed only when the stepping motor stops due to out-of-step and activated thereafter.

The hold current during the activation period may be expressed in a linear or exponential function approximated, for example, by the following expression (1).

$$I = a \times t^b \quad (1)$$

Here, the reference symbol "I" represents the hold current, and the reference symbol "t" represents the time elapse from the start (the time t10 of FIG. 2 or the like) of the hold period, and the reference symbols "a" and "b" are constants. When "b" is larger than 0 and smaller than 1, the variation pattern becomes close to the pattern shown by a broken line in FIG. 7, and when "b" is 1, the variation pattern becomes close to the pattern shown in FIG. 2, and when "b" is larger than 1, the variation pattern becomes close to the pattern shown by a broken line in FIG. 6.

Also, the hold current during the activation period may be expressed in the form of a sine wave approximated, for example, by the following expression (2).

$$I = c \left\{ \sin\left( \frac{\pi}{2 \times T_0} \times t + d \right) + e \right\} \quad (2)$$

Here, the reference symbol "$T_0$" represents the hold period (from the time t10 to the time t12), and the reference symbols "c", "d", and "e" are constants. When both of "d" and "e" are 0, the variation pattern becomes close to the pattern shown by the broken line in FIG. 7, and when "d" is $3\pi/2$ and "e" is 1, the variation pattern becomes close to the pattern shown by the broken line in FIG. 6.

Of course, the variation pattern may be a pattern approximated by any expression other than the above expressions (1) and (2). Any hold currents having those patterns can be implemented by appropriately changing the target current of the first illustrative embodiment or the voltage profile of the second illustrative embodiment.

Similarly to the activation period, even during the stop period, stop control may be performed such that a hold current as expressed by an expression obtained according to the above expression (1) or (2) flows.

The above described processes of the illustrative embodiments may be performed by software, or may be performed by a hardware circuit.

It should be understood that the illustrative embodiment disclosed herein are illustrative and non-restrictive in every respect. The scope of the present invention is defined by the terms of the claims, rather than the description above, and is intended to include any modifications within the scope and meaning equivalent to the terms of the claims.

What is claimed is:

1. A control device for a stepping motor, the control device configured to apply an excitation current to multiple coils to rotate a rotor, the control device comprising:

a drive unit configured to apply a drive voltage to the coils; and a control unit configured to control the drive voltage applied by the drive unit, wherein the control unit includes a stop control unit configured to perform, during a hold period of a stop period of the stepping motor, a stop control which gradually decreases a magnitude of the excitation current flowing in the coils such that the rotor moves to a predetermined stop position, and wherein the stop control unit is configured to perform the stop control such that a variation amount of the excitation current per unit time becomes a predetermined threshold value for the stopping period or less.

2. The control device according to claim 1,
wherein the predetermined threshold value for the stop period is set such that a level of sound generated when the rotor moves to the stop position becomes a predetermined level or less.

3. The control device according to claim 1,
wherein the stop control unit is configured to perform, during the hold period of the stop period, the stop control where a drive voltage subjected to pulse width modulation such that a duty ratio thereof decreases as time proceeds or a drive voltage whose voltage value decreases as time proceeds is applied to the coils by the drive unit, such that the excitation current gradually decreases as time proceeds.

4. The control device according to claim 1,
wherein the control unit further includes:
a detecting unit configured to detect the excitation current; and
a signal generating unit configured to generate a control signal such that, during the hold period of the stop period, the excitation current detected by the detecting unit becomes close to a predetermined target current which gradually decreases as time proceeds, and
wherein the drive unit is configured to generate a chive voltage subjected to pulse width modulation with a duty ratio according to the control signal generated by the signal generating unit.

5. The control device according to claim 4,
wherein when the excitation current detected by the detecting unit is less than the target current, the signal generating unit is configured to set the control signal at a first value such that the duty ratio of the drive voltage becomes larger than that before the setting, and
wherein when the excitation current detected by the detecting unit reaches the target current, the signal generating unit is configured to set the control signal at a second value such that application of the drive voltage to the multiple coils is stopped.

6. The control device according to claim 1,
wherein the stop control unit is configured to perform the stop control such that the excitation current linearly decreases during the hold period of the stop period.

7. The control device according to claim 1,
wherein the stop control unit is configured to perform the stop control such that a value of the excitation current at a start of the hold period of the stop period becomes larger than 30% of a value of the excitation current flowing in the coils before the hold period of the stop period starts.

8. The control device according to claim 1,
wherein the control unit further includes an out-of-step detecting unit configured to detect out-of-step of the stepping motor, and wherein when the stepping motor is stopped based on a detection result of the out-of-step detecting unit, the stop control unit is configured to perform the stop control such that an excitation pattern of the excitation current during the hold period becomes an excitation pattern same as that when out-of-step of the stepping motor is detected by the out-of-step detecting unit.

9. The control device according to claim 1,
wherein the control unit further includes an activation control unit configured to perform, during a hold period of an activation period of the stepping motor, an activation control which gradually increases the magnitude of the excitation current flowing in the coils such that the rotor moves to a predetermined initial position, and
wherein the activation control unit is configured to perform the activation control such that the variation amount of the excitation current per unit time becomes a predetermined threshold value for the activation period or less.

10. The control device according to claim 9,
wherein the activation control unit is configured to perform the activation control such that a value of the excitation current at an end of the hold period of the activation period becomes larger than 30% of the value of the excitation current flowing in the coils after the end of the hold period of the activation period.

11. The control device according to claim 9,
wherein the activation control unit is configured to perform the activation control only when the stepping motor is stopped based on the detection result of the out-of-step detecting unit and the stepping motor is driven next time.

12. A control device for a stepping motor, the control device configured to apply an excitation current to multiple coils to rotate a rotor, the control device comprising:
a drive unit configured to apply a drive voltage to the coils; and
a control unit configured to control the drive voltage applied by the drive unit,
wherein the control unit includes an activation control unit configured to perform, during a hold period of an activation period of the stepping motor, an activation control which gradually increases a magnitude of the excitation current flowing in the coils such that the rotor moves to a predetermined initial position, and
wherein the stop control unit is configured to perform the activation control such that a variation amount of the excitation current per unit time becomes a predetermined threshold value for the activation period or less, and that a value of the excitation current at an end of the hold period of the activation period becomes larger than 30% of the value of the excitation current applied after the end of the hold period of the activation period.

13. The control device according to claim 12,
wherein the control unit further includes an out-of-step detecting unit configured to detect out-of-step of the stepping motor, and
wherein the activation control unit is configured to perform the activation control only when the stepping; motor is stopped based on a detection result of the out-of-step detecting unit and the stepping motor is driven next time.

14. A control method for a stepping motor, which applies an excitation current to multiple coils to rotate a rotor, the control method comprising:
controlling a drive voltage applied to the coils during a normal driving period of the stepping motor; and
performing, during a hold period of a stop period of the stepping motor, a stop control which gradually decreases a magnitude of an excitation current flowing in the coils such that the rotor moves to a predetermined stop position,
wherein the stop control is performed such that a variation amount of the excitation current per unit time becomes a predetermined threshold value for the stop period or less.

15. A control method for a stepping motor, which applies an excitation current to multiple coils to rotate a rotor, the control method comprising:
controlling a drive voltage applied to the coils during a normal driving of the stepping motor; and
performing, during a hold period of an activation period of the stepping motor, an activation control which gradually increases a magnitude of the excitation current flowing in the coils such that the rotor moves to a predetermined initial position,
wherein the activation control is performed such that a variation amount of the excitation current per unit time becomes a predetermined threshold value for the activation period or less, and that a value of the excitation current at an end of the hold period of the activation period becomes larger than 30% of the value of the excitation current applied after the end of the hold period of the activation period.

* * * * *